United States Patent [19]

Bloom et al.

[11] 4,183,795
[45] Jan. 15, 1980

[54] CREATION OF $F_2^+$ COLOR CENTERS

[75] Inventors: David M. Bloom, Holmdel; Linn F. Mollenauer, Colts Neck, both of N.J.

[73] Assignee: Bell Telephone Laboratories, Incorporated, Murray Hill, N.J.

[21] Appl. No.: 908,774

[22] Filed: May 23, 1978

[51] Int. Cl.$^2$ .............................................. B01J 1/10
[52] U.S. Cl. ................... 204/157.1 R; 204/DIG. 11; 331/94.5 F
[58] Field of Search ................................ 204/157.1 R

[56] References Cited

U.S. PATENT DOCUMENTS 3,970,960  7/1976  Mollenauer ..................... 331/94.5 F Primary Examiner—Howard S. Williams
Attorney, Agent, or Firm—Daniel D. Dubosky

[57] ABSTRACT

Production of $F_2^+$ color centers in alkali halide crystals with densities high enough for efficient use in lasers is achieved by a two-step, highly selective photoionization mechanism. This mechanism is coupled with the use of suitable divalent metal ions as efficient and stable electron traps to allow nearly 100 percent conversion of $F_2$ color centers to $F_2^+$ color centers. The two-step photoionization mechanism comprises photo-exciting the $F_2$ color center to the first bound state, which requires lower energy than the corresponding transition for F color centers, then photoionizing the $F_2$ color center from the first bound state, and finally, capturing the electron thus liberated on the divalent metal ions.

8 Claims, 7 Drawing Figures

CREATION OF $F_2^+$ COLOR CENTERS

BACKGROUND OF THE INVENTION

The invention pertains to the field of $F_2^+$ color center lasers.

The $F_2^+$ color center in alkali halide crystals has been shown to provide a nearly ideal gain mechanism for efficient, broadly tunable, optically pumped, CW and pulse lasers in the near infrared. This is because:

(1) The small Stokes shift for the infrared transition implies that the emission band of the $F_2^+$ color center has the same high oscillator strength ($f \sim 0.2$) as has the absorption band;

(2) There is strong evidence for a nearly 100 percent quantum efficiency;

(3) Using the calculated energies of the $H_2^+$ molecular ion, the splitting between the lowest lying even parity excited state $2S_{\sigma g}$ and the $2P_{\sigma u}$ state can be predicted to be much too large to allow for self-absorption at the emission energy, and (4) Thus far there are no known color center species foreign to the $F_2^+$ that would absorb photons of the lower energy emission band other than one center type which is probably a variety of $F_3^+$ color center and is easily eliminated or otherwise avoided.

The laser action does not seem to suffer from bleaching or aging effects during normal operation as contrasted by such effects in the organic dyes. Also, the required optical pump power at threshold is usually many times less than that required for the most efficient dye lasers.

The $F_2^+$ color center laser in alkali halides will provide coverage for laser outputs in the range $0.8 \lesssim \lambda \lesssim 2$ $\mu$m. This region is of fundamental importance to molecular spectroscopy, pollution detection, fiber optic communications, and the physics of narrow-band-gap semiconductors.

However, the production of $F_2^+$ color center densities high enough for efficient use in lasers, especially in those whose cavity modes are tightly focused, has been a major source of difficulty.

$F_2$ color centers are typically converted to $F_2^+$ color centers by subjecting the $F_2$ color centers to ionizing radiation. The conversion is permanent if suitable electron traps have been provided for the excess electrons ejected from the $F_2$ color centers. However, there is a need for an alternative to the ordinary (single-step) photoionization process for creating $F_2^+$ color centers. This need arises because the present methods of creating $F_2$ or $F_2^+$ color centers results in densities which are considerably outnumbered by accompanying F color centers. The ground states of the F and $F_2$ color centers lie approximately the same distance below the conduction band in the crystal and the photoabsorption cross-sections and ionization efficiencies of these two color centers are comparable in the single-step photoionization range. These conditions cause the fractional ionization of $F_2$ color centers obtained using the single-step photoionization process to be low. The fractional ionization may be improved by adding external electron traps, but the density of such external traps must be larger than the sum of all ionizable species. Such large densities of traps are very hard to achieve in practice and even if achievable, they would lead to other undesirable effects such as obtaining a large density of $F^+$ color centers. The $F^+$ color centers, due to their mobility at temperatures in excess of $\sim 200°$ K., would destabilize the admixture of color center populations. In particular, one would risk creating a variety of $F_3^+$ color centers which tend to absorb radiation in the region of the $F_2^+$ luminescence band.

SUMMARY OF THE INVENTION

In accordance with the present invention, a method for creating $F_2^+$ color centers is provided which (a) causes an essentially complete conversion of $F_2$ to $F_2^+$ color centers, (b) obtains the conversion in the presence of an external electron trap density no greater than that of the original $F_2$ color center population, and (c) is selective in such a manner that substantially no positively ionized species other than the $F_2^+$ color centers are produced.

The method for creating the $F_2^+$ color centers comprises:

(1) incorporating, for external electron traps, a sufficient number of divalent metal ions, of a size that sets well in the crystal lattice, into an alkali halide crystal;

(2) creating anion vacancies and F color centers in the alkali halide crystal when it is cooled sufficiently to prevent vacancy diffusion (such anion vacancies may be created by such mechanisms as radiation damage from electron beams, high intensity gamma rays, or high intensity X-ray sources);

(3) warming the alkali halide crystal to room temperature for a short time to allow F and $F_2^+$ color centers to form therein;

(4) cooling the crystal to laser-operating temperature; and (5) irradiating the alkali halide crystal with the appropriate radiation to provide the two-step photoionization.

One feature of this invention is that very large densities ($\sim 10^{18}/cm^3$) of $F_2^+$ color centers are provided. The $F_2^+$ color centers are accompanied by little else but F color centers.

Another feature of this invention is that use with heavier alkali halides should extend the presently achieved tuning range of $0.82 \leq \lambda \leq 1.5$ $\mu$m (obtained with hosts LiF, NaF and KF) beyond 2 $\mu$m.

Yet another feature of this invention is that the $F_2^+$ color centers may be created with low power laser beams.

Yet another feature of this invention is that $F_2^+$ color centers may be created with small inexpensive flashlamps or arc lamps equipped with long-pass filters to avoid direct pumping of the F absorption band.

Yet another feature of this invention is that other positively charged color centers such as $F_3^+$ may be destroyed when the $F_2^+$ color centers are created.

BRIEF DESCRIPTION OF THE DRAWING

A complete understanding of the present invention and of the above and other features thereof may be gained from a consideration of the following detailed description presented hereinbelow in connection with the accompanying diagram in which.

DETAILED DESCRIPTION OF THE DRAWING

Figure 1:
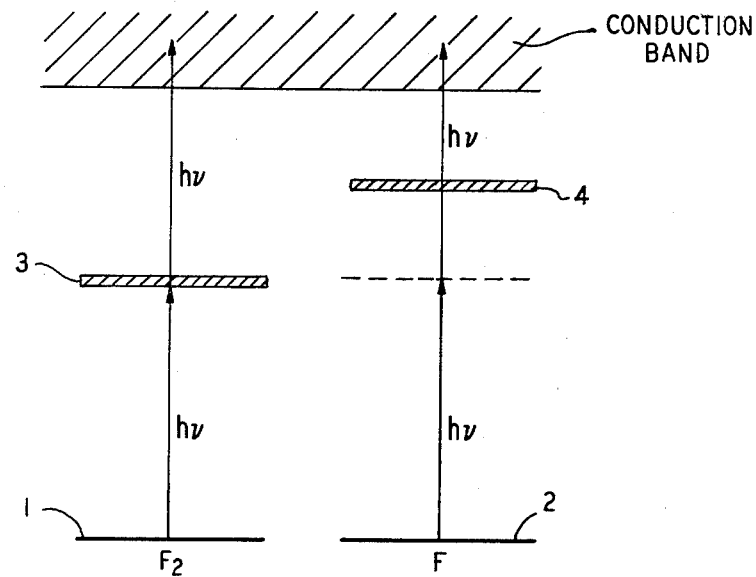
FIG. 1 shows a diagram of the relevant energy levels for the photoionization mechanism for $F_2$ and F color centers.

FIG. 1 shows a diagram of the relative energy levels of the ground state and the first bound excited state for both $F_2$ and F color centers. We note first, that ground states 1 and 2 for both color centers lie at substantially the same depth below the conduction band in the alkali halide crystal whereas first excited state 4 for the F color center is considerably closer to the conduction band than first excited state 3 for the $F_2$ color center. The selectivity of the two-step photoionization which ejects an electron from the $F_2$ color center is based upon the fact that photons will excite the electron from ground state 1 to excited state 3 and then from excited state 3 to the conduction band for $F_2$ color centers. This same process is inhibited for the F color center because the photon which resonantly excites an electron to excited state 3 for $F_2$ color centers will not do so for the F color center. Although FIG. 1 indicates that the photon which excited the electron from ground state 1 to excited state 3 for $F_2$ color centers has sufficient energy so that a second photon from the same beam is able to excite the electron from excited state 3 to the conduction band, this is not a limitation on the invention. In the event that the photon source had insufficient energy to ionize the $F_2$ color center from excited state 3, one would merely simultaneously expose the crystal to radiation having two frequencies. Photons at the first frequency would raise the electron from the ground state to an excited state and photons at the second frequency would complete the ionization of the $F_2$ center. Thus, the invention provides that a source of radiation, tuned to the $F_2$ ground state—excited state transition, can provide for a two-step photoionization whose rate will be many orders of magnitude greater than the nonresonant two-step photoionization rate of the F color center. In fact, for all practical purposes the latter rate is negligible.

The dynamics of the ionization mechanism can be expressed more exactly through a set of conservation and rate equations. In the crystal let $F^+$ represent the density of anion vacancies, F represent the density of F color centers, $F'$ represent the density of $F'$ color centers (i.e., an anion vacancy containing two electrons), $M^+$ represent the density of $F_2^+$ color centers, M represent the density of $F_2$ color centers, T represent the density of empty external electron traps, $T'$ represent the density of filled external electron traps, and $\rho$ represent the density of free electrons. Also, let $\sigma_j$ represent the electron capture cross-section in the crystal for the $j^{th}$ mode of capture, $\omega_k$ represent the photoionization rate in the crystal for the $k^{th}$ photoionization mode, and $\mu$ represent the free electron mobility in the crystal. In order to keep the equations relatively straightforward, the possibility of creating $F_2^-$ centers has been omitted. This simplification does not substantially effect the results. Also, the exclusion is justified on physical grounds due to the fact that the $F_2^-$ centers would be highly volatile at reasonable pumping conditions as well as due to the fact that no evidence for their existance has been found in absorption spectra performed on the crystals used in the reduction to practice.

$$M^+ + M = M_o \qquad (1)$$

represents the fact that the total number of divalent color centers is a constant.

$$F^+ + F + F' = F_o \qquad (2)$$

represents the fact that the total number of single vacancy centers is a constant.

$$T + T' = T_o \qquad (3)$$

represents the fact that the sum of the empty and the filled external electron traps is a constant.

$$T' + F' + \rho - M^+ - F^+ = 0 \qquad (4)$$

represents the fact that the crystal is to remain electrically neutral.

Figure 2:
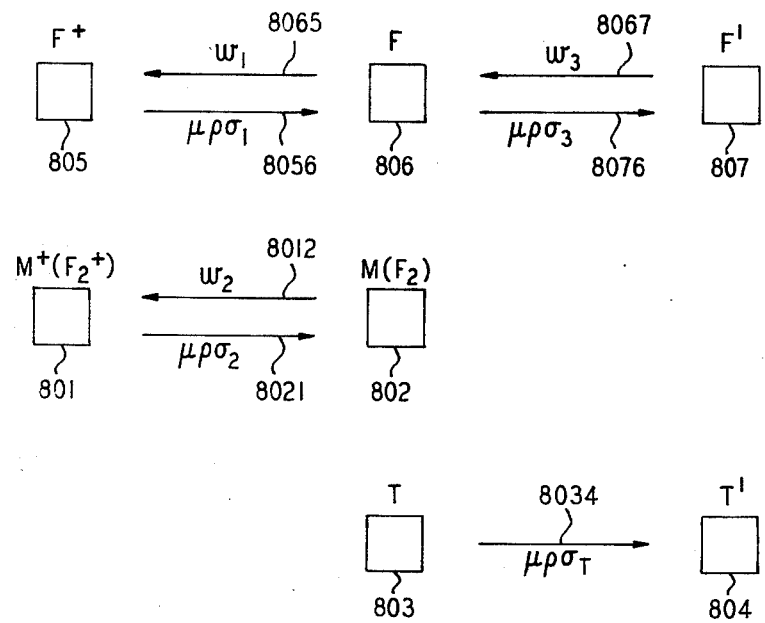
FIG. 2 shows a diagram of the competing physical mechanisms in the crystal during photoionization.

The rate equations for the color center formation can be best understood by referring to FIG. 2. First, one notes that under conditions of equilibrium the rate of change of the density of $F_2^+$ color centers, the density of anion vacancies, the density of $F'$ color centers, and the density of empty external electron traps equal zero, i.e., $$\frac{dM^+}{dt} = \frac{dF^+}{dt} = \frac{dF'}{dt} = \frac{dT}{dt} = 0.$$

$$\frac{dM^+}{dt} = \omega_2 M - \mu \rho \sigma_2 M^+, \qquad (5)$$

i.e., the rate of change of the density of $F_2^+$ centers 801 has a positive contribution (line 8012 in FIG. 2) from photoionization of $F_2$ color centers 802 ($\omega_2$ is the rate of photoionization for $F_2$ color centers) and a negative contribution (line 8021 in FIG. 2) from the capture of free electrons by $F_2^+$ centers 801 that are already formed ($\sigma_2$ is the electron cross-section in the crystal for $F_2^+$ color centers).

$$\frac{dF^+}{dt} = \omega_1 F - \mu \rho \sigma_1 F^+, \qquad (6)$$

i.e., the rate of change of the density of anion vacancies has a positive contribution (line 8065 in FIG. 2) from photoionization of anion vacancies 806 ($\omega_1$ is the rate of photoionization for anion vacancies) and a negative contribution (line 8056 in FIG. 2) from the capture of free electrons by anion vacancies 805 that are already formed ($\sigma_1$ is the electron cross-section in the crystal for anion vacancies).

$$\frac{dF}{dt} = \mu \rho \sigma_3 F - \omega_3 F, \qquad (7)$$

i.e., the rate of change of the density of $F'$ centers 807 has a positive contribution (line 8076 in FIG. 2) from the capture of free electrons by F color centers 806 ($\sigma_3$ is the electron cross-section in the crystal for F color centers) and a negative contribution (line 8067 in FIG. 2) from photoionization of F' centers 807 that are already formed ($\omega_3$ is the rate of photoionization for F' color centers).

$$\frac{dT}{dt} = -\mu \rho \sigma_T T, \tag{8}$$

i.e., the rate of change of the density of empty external electron traps 803 has a negative contribution (line 8034 in FIG. 2) from the capture of free electrons by empty external electron traps 803 ($\sigma_T$ is the electron cross-section in the crystal for empty electron traps).

This equation has included the assumption that the traps are not photoionized by the photon energies which are used to ionize the $F_2$ color centers. A further implication of Eq. 8 is that $\rho=0$ unless all the external electron traps have been used up, i.e., captured an electron (T=0). When T=0, i.e., when each trap has captured an electron, $\rho$ scales with the rates of photoionization which can then be made negligibly small with respect to the densities of color centers and thus be eliminated from Eq. 4. When the rates are thusly scaled down, the densities of color centers obtained at equilibrium remain substantially unchanged after the ionization source is turned off. These equations are now discussed with respect to a comparison of the two-step photoionization mechanism of the present invention and the single-step ionization process of the prior art to show the advantageous results obtained by the present invention.

Consider the two-step ionization mechanism where $\omega_1=0$ (the rate of photoionization for F color centers is negligible because the photons used will not excite F color centers, as discussed hereinabove), $\omega_2>0$ (the rate of photoionization for $F_2$ color centers is positive and enhanced by the photons chosen for the process as discussed hereinabove), and $\omega_3>0$ (the rate of F' color centers is positive due to the overlap of the F' absorption band with that of the $F_2$ color center). If we provide a sufficient density of traps so that $\rho=0$, then Eqs. 5 and 1 give the result that $M^+=M_o$, i.e., the important result that ionization of the $F_2$ color centers is 100 percent complete. Additionally, one obtains from Eq. 7 the result that F'=0 (the density of F' color centers is zero because they, too, were completely photoionized). This is useful because it removes the possibility of having electrons from the volatile F' color centers discharge the desired $F_2^+$ color centers. Since there is no mechanism for creating $F^+$ color centers (i.e., $\omega_1=0$) the important result $F^+=0$ is obtained. Lastly, Eq. 4 gives $T_0-T=M_o$, i.e., $T_o$ (density of external electron traps put into the crystal) need be no greater than $M_o$ (the density of divalent color centers) to have 100 percent ionization of the $F_2$ color centers. If the density of traps is less than the density of $F_2$ color centers, we still have $F'=F^+=0$, but the density of $F_2^+$ color centers formed is limited to the density of external electron traps put into the crystal.

Consider the single step photoionization process of the prior art where both $\omega_1>0$ and $\omega_2>0$ (because the photon which has sufficient energy to photoionize an $F_2$ color center will also have sufficient energy to photoionize an F color center). Combining Eqs. 1, 5 and 6 gives $$\frac{M^+}{M_o} = [1 + \beta (F/F^+)]^{-1} \tag{9}$$

where $$\beta = \frac{\omega_1 \sigma_2}{\omega_2 \sigma_1}$$

is of the order of 1.

(Note further that under normal operation conditions $M_0 \ll F_o$, i.e., the density of $F_2$ color centers is so much less than the density of F color centers that the $F_2^+$ color centers can be treated as a minority species.) Focus first on the case where $T_o=0$, i.e., where there are no external electron traps in the crystal. Experimental results of M. A. Aegerter and F. Luty in Physics Stat. Sol. (b) 43, 227 (1971) have given single-step photoionization yields of $M^+/M_o \cong 0.03$. Using this result to justify neglect of $M^+$ in Eq. 4 gives $F' \cong F^+$. Then Eqs. 6 and 7 give:

$$\frac{\alpha F}{F^+} = \frac{F}{F} \tag{10}$$

where $$\alpha = \frac{\omega_1 \sigma_3}{\omega_3 \sigma_1}$$

Finally, substituting $F^+$ for F' in Eq. 10 results in $F/F^+ \cong 1/\sqrt{\alpha}$. Using this last result in combination with the above cited experimental result leads to the fact that $\alpha$ is quite small, i.e., $\sim 10^{-3}$. Focus next on the case where $M_o<T_o<F_o$. This is the case where the density of divalent color centers is less than the density of external electron traps in the crystal which is in turn less than the density of single vacancy centers in the crystal. As above, we may neglect $M^+$ with respect to $F^+$ and obtain as the analogue to Eq. 10:

$$F^+ = -\frac{T_o}{2} + \sqrt{\left(\frac{T_o}{2}\right)^2 + \alpha F_o^2}. \tag{11}$$

Using the fact that $\alpha$ is $\ll 1$, Eq. 11 reduces to $F^+ \sim T_o$ if $T_o$ is not too small ($T_o \gg \alpha F_o$) and Eq. 9 becomes $$\frac{M^+}{M_o} \cong \left[1 + \beta \left(\frac{F_o - T_o}{T_o}\right)\right]^{-1}. \tag{12}$$

This result teaches that the fractional ionization of $F_2$ color centers is severely limited by the presence of a large density of F color centers for the single-step photoionization, unless $T_o$, the density of external electron traps, is comparable to or greater than $F_o$, the density of single vacancy color centers. However, for the $F_2^+$ color center densities of up to $10^{18}/cm^3$ needed for lasers, the required $T_o$, external trap density, is not achievable. But as previously discussed, even if they were, there would be other undesirable features; namely, one would also obtain a large density of $F^+$ color centers. The $F^+$ color centers, due to their mobility at temperatures in excess of 200° K., would destabilize the admixture of color center populations. In particular, one would risk creating a variety of $F_3^+$ color centers that absorbs in the region of the $F_2^+$ luminescence span and would thus adversely effect the laser action.

Figure 3:
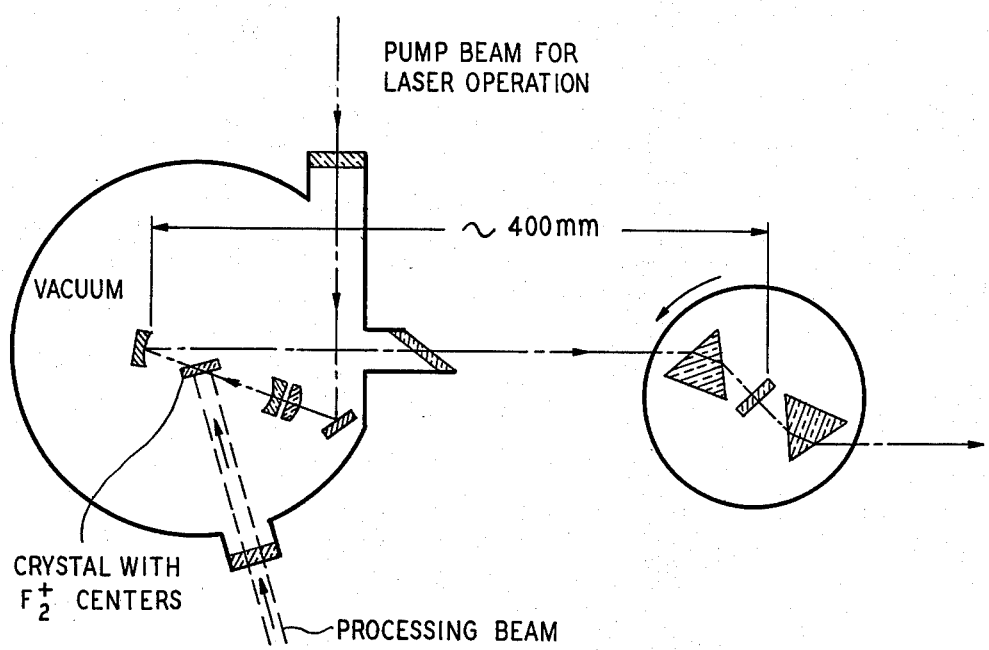
FIG. 3 shows the embodiment in which the two-step photoionization mechanism was reduced to practice.

The principal of operation and efficiency of the invention has been demonstrated in the embodiment for the two-step photoionization mechanism shown in FIG. 3. The first reduction to practice was performed with a NaF crystal containing approximately 100 ppm of $Mn^{++}$ as the external electron trap. In the first step the crystal was created and doped with the traps according to the process outlined in the article "Crystal Growth from the Melt (I) General" disclosed in Crystal Growth and Characterization, Proceedings of the ISSCG2 Spring School, Japan, 1974, published by North-Holland on p. 61, by R. Ueda and J. B. Mullin and in particular in accordance with the method "Horizontal Crystal Growth" discussed on p. 64. In the next step the crystal was cleaved and polished to the desired shape (1.9 mm×10 mm×10 mm). The two opposing large faces of the crystal were optically polished by using one of several methods. Absolute ethanol and Linde B (finely divided $Al_2O_3$ powder with 2.05 μm particle size) on a suitable lap such as a cotton handkerchief stretched taut over a flat plate or a cotton velvet lap was good for mildly hygroscopic crystals such as NaF. Oelic acid and Linde B (finely divided $Al_2O_3$ powder with 2.3 μm particle size) on a suitable lap such as "politex supreme," a plastic cloth, was good for all alkali halide crystals, but was necessary for highly hygroscopic crystals such as KF. The oelic acid is just polar enough to keep the abrasive particles dispersed, but does not attack the crystals. In the next step the shaped, annealed and polished crystals were sealed in a single layer of Al foil (~12 μm thick) in a dry $N_2$ atmosphere and exposed to a 1 MeV, 1.6 μA/cm² e⁻beam for fifteen minutes on each 10 mm×10 mm side while they were cooled to T~170°−200° K. by a stream of dry $N_2$ gas. This step creates high densities of both empty vacancies and F centers. In the next step the crystals were warmed to room temperature in a dry box and under a safe light ($\lambda \geq 0.55$ μm). The step of warming up the crystals causes:

(1) $F_2^+$ color center formation when the vacancies, formed by the electron beam radiation, become mobile and attach themselves to F color centers and (2) $F_2$ color center formation when volatile F' color centers give up an electron which is captured by the $F_2^+$ color centers formed as in (1). The step of warming up the crystals required ~5–10 minutes. In the next step the crystal was loaded into the laser Dewar shown in FIG. 3. This arrangement was disclosed in U.S. Pat. No. 3,970,960. The process of loading the crystal into the laser Dewar provided the necessary time for the formation of the $F_2$ color centers. An advantage of this procedure is that after irradiating the crystal with the beam which provides for the two-step photoionization mechanism the crystal is already in place to be used for laser action in the apparatus disclosed in U.S. Pat. No. 3,970,960. The crystal slab was held against a Cu cold finger with a gentle spring clamp. No grease or other thermally conductive compound was used, in order not to strain or fracture the crystal by differential thermal contraction. The two opposing large faces of the crystal were [100] planes. The crystal was usually oriented such that the plane of the paper in FIG. 3 contained a [110] axis, but this is not necessary for the isotropic distribution of $F_2^+$ color centers obtained here.

Figure 4:
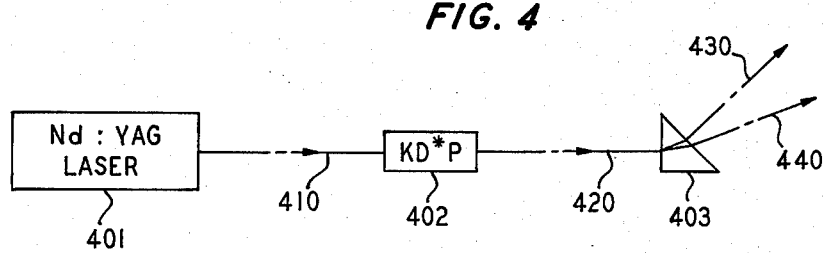
FIG. 4 shows the method for generating the laser beam used for the first reduction to practice with a NaF crystal.
Figure 5:
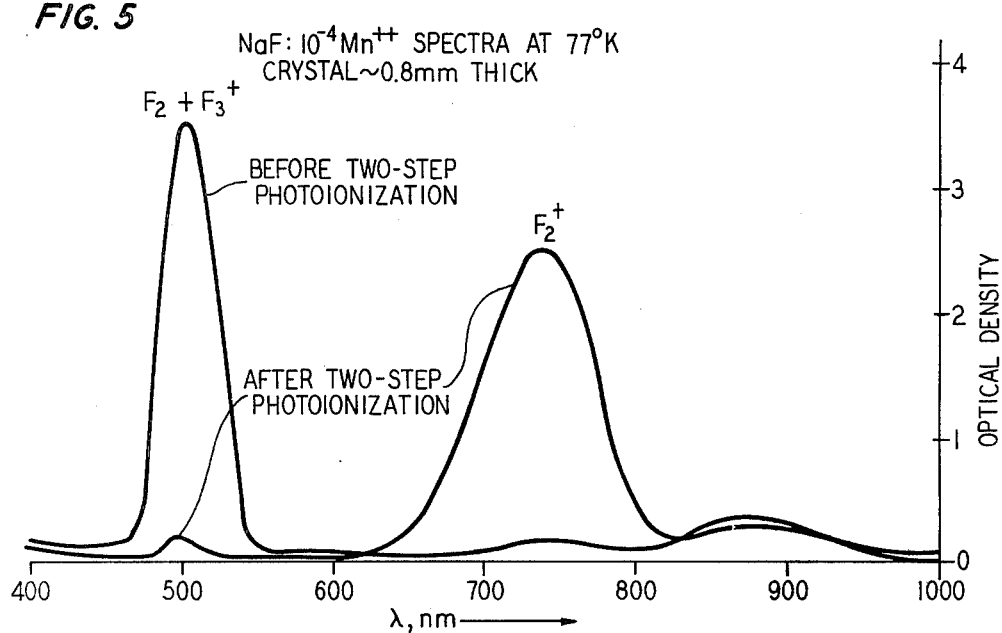
FIG. 5 shows the results of absorption spectra which were obtained using a NaF crystal both before and after the two-step photoionization.

The first reduction to practice utilized the second harmonic of a pulsed Nd:YAG laser as the two-step photoionization photon source, since this wavelength ($\lambda = 532$ nm) lies within the absorption band of the first excited state of the $F_2$ color center in NaF. The photon source was produced as shown in FIG. 4. Nd:YAG laser 401 produced beam 410 containing radiation at $\lambda = 1064$ nm which impinged upon KD*P crystal 402. Beam 420 which emerged from crystal 402 contains radiation with components at $\lambda = 1064$ nm and $\lambda = 532$ nm. The component of beam 420 containing $\lambda = 532$ nm was separated from the component containing $\lambda = 1064$ nm by passing beam 420 through prism 403. Beam 430 emerging from prism 403 contained radiation at $\lambda = 532$ nm and beam 440 contained radiation at $\lambda = 1064$ nm. FIG. 5 shows the absorption spectrum of the NaF crystal both before and after the exposure to a few dozen intense pulses (I~10 MW/cm²) of the radiation at $\lambda = 532$ nm. These absorption spectra were measured in the apparatus disclosed in "Simple Optical Absorption Spectrometer Suitable for Measurements at Low Temperatures" by L. F. Mollenauer and D. H. Olson, Rev. Sci. Instrum., Vol. 46, No. 6, June 1975, pp. 677–679. FIG. 5 clearly shows the presence of $F_2$ color centers before the two-step photoionization. The FIG. also shows, in respect to the curve corresponding to the absorption spectrum made subsequent to the two-step photoionization mechanism, that a nearly complete conversion of $F_2$ color center population to $F_2^+$ color center population has taken place. A further advantageous and unexpected result was also achieved. This result is that the part of the original absorption band near $\lambda \cong 500$ nm which is due to $F_3^+$ color centers has also all but disappeared. The results achieved also indicate that the number of $F_2$ color centers inferred from the height of the absorption spectrum taken prior to radiation cannot, taken by itself, account for the number of $F_2^+$ color centers which contribute to the height of the absorption spectrum taken subsequent to the radiation. It is concluded that a portion of the $F_3^+$ color centers were themselves converted to $F_2^+$ color centers.

Figure 6:
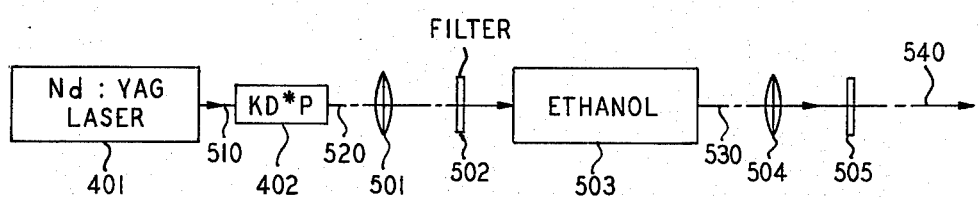
FIG. 6 shows one method for generating the laser beam used for the second reduction to practice with a KF crystal.

Another reduction to practice was performed with KF crystals doped with $Pd^{++}$. These crystals were prepared in the same manner which has been previously described. However, the $Pd^{++}$ was introduced into the melt as $PdCl_2$. The radiation used for the two-step photoionization in this reduction to practice was generated as shown in FIG. 6. Nd:YAG laser 401 produced beam 510 containing radiation at $\lambda = 1064$ nm which impinged upon KD*P crystal 402. Beam 520 which impinged from crystal 402 contained radiation with components at $\lambda = 1064$ nm and $\lambda = 532$ nm. Lens 501 focused beam 520 into cell 503 which contained pure ethanol. Filter 502 removed the $\lambda = 1064$ nm component from beam 520. Beam 520 was Raman shifted by the ethanol to produce beam 530 containing both the first Stokes output at $\lambda \sim 630$ nm and the second Stokes output at $\lambda \sim 772$ nm. The first Stokes output fell within the absorption band of the $F_2$ color center in KF. Fiiter 505 removed the second Stokes output at $\lambda \sim 772$ nm from beam 530 to form beam 540. Lens 504 focused beam 530 so that when beam 540 emerged from filter 505, it was focused on the KF crystal. The results obtained with respect to $F_2^+$ color center formation were essentially the same as those obtained with the NaF crystal. The second Stokes output at $\lambda \sim 772$ nm falls within the $F_3^+$ color center absorption band. A further exposure was made where this output was left in the beam which impinged on the KF crystal. As a result, the $F_3^+$ color centers were destroyed.

Figure 7:
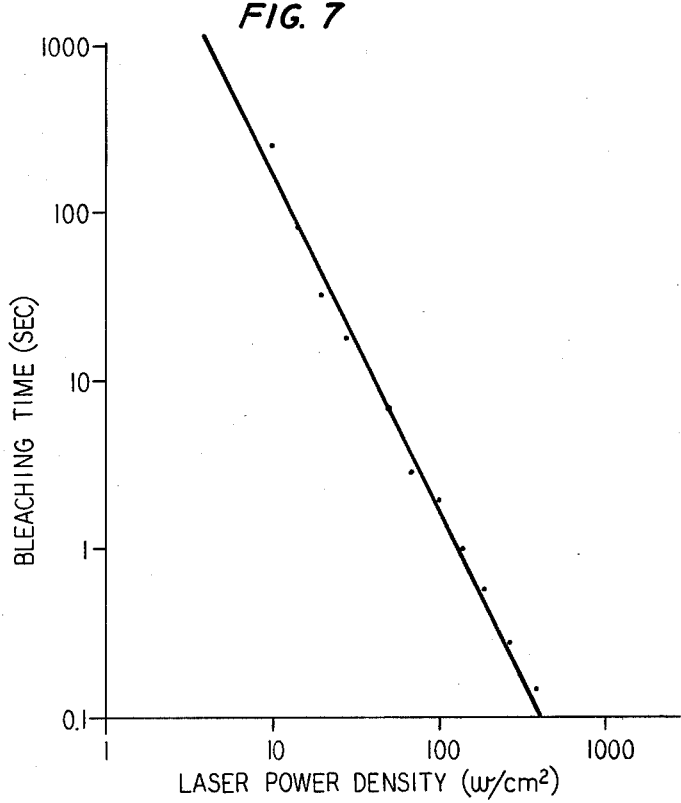
FIG. 7 shows a log-log plot of the bleaching time for the KF crystal versus the power density of the incident radiation which induced the two-step photoionization.

A further aspect of the invention was investigated which pertained to the intensity of radiation which would be sufficient to cause the two-step photoionization mechanism to be successful. A CW Krypton-ion laser output at 648 nm provided a nearly perfect match to the $F_2$ color center absorption band for the KF crystals. The crystals were pumped by an unfocused ($A \sim 0.01$ cm$^2$), 4W beam from the Crypton-ion laser. Measurements made of the characteristic times for bleaching of the $F_2$ color center band are displayed in FIG. 7 on a log-log plot. The slope of the line drawn through the points equals two, verifying the fact that the $F_2^+$ color centers are being formed by a two-step photoionization mechanism. The completeness of the bleaching was found to be independent of the rate at which it was being performed. These results indicate that a small inexpensive flashlamp, such as was used to pump the Nd:YAG laser, or a small, high intensity arc lamp could be used for the present invention in conjunction with a long-pass filter to avoid direct pumping of the F color center band at the same time.

The present invention should not be limited by the discussion hereinabove to materials where the preferential two-step photoionization mechanism is accomplished by two photons from the same beam. The principles presented herein would function equally as well in material where two photons of unequal energy were needed for ionization.

A discussion of the procedures for choosing external electron traps follows hereinbelow.

Materials are needed which have the properties that:
(1) Divalent ions will be formed in the alkali halide crystal;
(2) The ionic radii of the divalent ion is of such size that two divalent ions cannot fit into the same interstitial position in the alkali halide crystal; and
(3) The electrons trapped by such divalent ions lie in energy levels further below the continuum than the F color center ground state. Based on the work of K. H. Umbach and H. J. Paus, "On the $F_Z$ Centre Problem: Lanthanide $F_Z$ Centres," in Abstract 77 of the 1971 Int'l Conf. on Color Centres in Ionic Crystals, Reading, England and the work of J. Simionetti and D. S. McClure, "Systematics of Energy Levels of Ions in Host Crystals" in Abstract 394, Int'l Conf. on Defects in Insulating Crystals, Gattlinburg, Tenn., 1977, certain divalent transition metal ions were used as external electron traps. The references indicated that an electron trapped by a divalent transition metal ion would lie deeper below the continuum than does the F color center ground state. Thus, dopants Mn$^{++}$, Cr$^{++}$, and Ni$^{++}$ were used in NaF at doping levels of 30-100 ppm. The results obtained with the two-step photoionization mechanism were satisfactory and showed that each of these ions worked well as an external electron trap.

A further test was attempted using Mn$^{++}$ in a KF host crystal. The results obtained indicated that the Mn$^{++}$ was ineffective as an external electron trap in KF. This result is thought to be due to the fact that the divalent metal ions tend to aggregate if the ion size is small enough relative to the host lattice. To avoid this "ion-size" problem, an element from the next row of the periodic table was chosen with the view towards providing a larger ion. The element chosen was Pd. The resultant KF crystal doped with Pd$^{++}$ gave good production of $F_2^+$ color centers when processed according to the present invention.

What is claimed is:

1. A process for creating $F_2^+$ color centers in alkali halide crystals having external electron traps which comprises the steps of:
    cooling said alkali halide crystal;
    damaging said alkali halide crystal to form anion vacancies and F color centers therein;
    warming said alkali halide crystal so that $F_2$ color centers are formed therein, said $F_2$ color centers having an excited state lying between the ground state of said $F_2$ color center and the conduction band, which excited state has a first energy difference from said ground state of said $F_2$ color center, said F color centers having other excited states at other energy differences above the ground state of said F color center;
    cooling said alkali halide crystal to laser operating temperature; and
    irradiating said alkali halide crystal with radiation from an irradiating means, said radiation having photons with an energy substantially equal to said first energy difference and not substantially equal to said other energy differences, whereby a first photon from said radiation excites said $F_2$ color center from said ground state to said excited state and a second piston from said radiation ejects an electron from said $F_2$ color center in said excited state to form said $F_2^+$ color center, said electron being captured by said external electron traps.

2. A process for creating $F_2^+$ color centers in alkali halide crystals as defined in claim 1 wherein said external electron traps comprise divalent metal ions of comparable size with the lattice constant of said alkali halide crystal.

3. A process for creating $F_2^+$ color centers in alkali halide crystals as defined in claim 1 wherein said step of damaging said alkali halide crystal comprises bombarding said alkali halide crystal with electrons from an electron source.

4. A process for creating $F_2^+$ color centers in alkali halide crystals as defined in claim 1 wherein said irradiating means comprises a laser source for generating a laser beam whose radiation is resonant with said excited state.

5. A process for creating $F_2^+$ color centers in alkali halide crystals as defined in claim 1 wherein irradiating means comprises:
    a lamp for generating radiation; and
    a long-pass filter for filtering said radiation to remove radiation components which are resonant with the first excited state of F centers in said alkali halide crystal.

6. A process for creating $F_2^+$ color centers in alkali halide crystals having external electron traps which comprises the steps of:
    cooling said alkali halide crystal;
    damaging said alkali halide crystal to form anion vacancies and F color centers therein;
    warming said alkali halide crystal so that $F_2$ color centers are formed therein, said $F_2$ color centers having an excited state lying between the ground state of said $F_2$ color center and the conduction band, which excited state has a first energy difference from said ground state of said $F_2$ color center, said F color centers having other excited states at other energy differences above the ground state of said F color center;

cooling said alkali halide crystal to laser operating temperature; and irradiating said alkali halide crystal with first radiation from a first irradiating means, said first radiation having photons with an energy substantially equal to said first energy difference and not substantially equal to said other energy differences, whereby a photon from said first radiation excites said $F_2$ color centers from the ground state to said excited state; and irradiating said alkali halide crystal with second radiation from a second irradiating means at substantially the same time as irradiating said alkali halide crystal with said first radiation, said second radiation having photons with an energy larger than the energy difference between the excited state and the conduction band but smaller than the energy difference between the ground state and the conduction band of said $F_2$ color center, whereby an electron is ejected from said $F_2$ color center in said excited state to form said $F_2^+$ color center, said electron being captured by said external electron traps.

7. A process for creating $F_2^+$ color centers in an alkali halide crystal having external electron traps and $F_2$ color centers and F color centers, said $F_2$ color centers having an excited state lying between the ground state of said $F_2$ color center and the conduction band, which excited state has a first energy difference from said ground state of said $F_2$ color center, said F color centers having other excited states at other energy differences above the ground state of said F color centers, said process comprising the steps of;

cooling said alkali halide crystal; and irradiating said alkali halide crystal with radiation from an irradiating means, said radiation having photons with an energy substantially equal to said first energy difference and not substantially equal to said other energy differences, whereby a first photon from said radiation excites said $F_2$ color center from said ground state to said excited state and a second photon from said radiation ejects an electron from said $F_2$ color center in said excited state to form said $F_2^+$ color center, said electron being captured by said external electron traps.

8. A process for creating $F_2^+$ color centers in alkali halide crystals having external electron traps and $F_2$ color centers and F color centers, said $F_2$ color centers having an excited state lying between the ground state of said $F_2$ color center and the conduction band, which excited state has a first energy difference from said ground state of said $F_2$ color center, said F color centers having other excited states at other energy differences above the ground state of said F color center, said process comprising the steps of:

cooling said alkali halide crystal;

irradiating said alkali halide crystal with first radiation from a first irradiating means, said first radiation having photons with an energy substantially equal to said first energy difference and not substantially equal to said other energy differences, whereby a photon from said first radiation excites said $F_2$ color centers from the ground state to said excited state; and irradiating said alkali halide crystal with second radiation from a second irradiating means, said second radiation having photons with an energy larger than the energy difference between the excited state and the conduction band but smaller than the energy difference between the ground state and the conduction band of the $F_2$ color center whereby, an electron is ejected from said $F_2$ color center in said excited state to form said $F_2^+$ color center, said electron being captured by said external electron traps.

* * * * *

UNITED STATES PATENT AND TRADEMARK OFFICE
CERTIFICATE OF CORRECTION

PATENT NO. : 4,183,795

DATED : January 15, 1980

INVENTOR(S) : David M. Bloom and Linn F. Mollenauer

It is certified that error appears in the above-identified patent and that said Letters Patent are hereby corrected as shown below:

Column 7, line 19, "2.05μm" should read --0.05μm--.

Column 7, line 23, "Linde B" should read --Linde A--.

Column 7, line 24, "2.3μm" should read --0.3μm--.

Signed and Sealed this

Fourth Day of November 1980

[SEAL]

Attest:

SIDNEY A. DIAMOND

Attesting Officer

Commissioner of Patents and Trademarks